US008221862B2

(12) United States Patent
Saitoh et al.

(10) Patent No.: US 8,221,862 B2
(45) Date of Patent: Jul. 17, 2012

(54) POLYPHENYLENE SULFIDE RESIN COMPOSITION, PROCESS FOR PRODUCING THE SAME, AND MOLDED ARTICLE

(75) Inventors: Kei Saitoh, Aichi (JP); Naoya Nakamura, Aichi (JP); Atsushi Ishio, Aichi (JP)

(73) Assignee: Toray Industries, Inc. (JP)

( * ) Notice: Subject to any disclaimer, the term of this patent is extended or adjusted under 35 U.S.C. 154(b) by 829 days.

(21) Appl. No.: 12/293,199

(22) PCT Filed: Mar. 14, 2007

(86) PCT No.: PCT/JP2007/055055
§ 371 (c)(1),
(2), (4) Date: Sep. 16, 2008

(87) PCT Pub. No.: WO2007/108384
PCT Pub. Date: Sep. 27, 2007

(65) Prior Publication Data
US 2009/0041968 A1    Feb. 12, 2009

(30) Foreign Application Priority Data
Mar. 16, 2006 (JP) ................................. 2006-073532
Jul. 28, 2006 (JP) ................................. 2006-206190

(51) Int. Cl.
*B29D 22/00* (2006.01)
*B29D 23/00* (2006.01)
*B32B 1/08* (2006.01)

(52) U.S. Cl. ............... 428/36.92; 428/36.9; 428/35.7; 428/397; 525/535; 525/537; 525/114; 524/196

(58) Field of Classification Search ............... 428/36.9, 428/36.92, 35.7, 397; 525/519, 535, 537, 525/114; 524/196
See application file for complete search history.

(56) References Cited

FOREIGN PATENT DOCUMENTS

| JP | 4-130158 A | 5/1992 |
|---|---|---|
| JP | 5-86293 A | 4/1993 |
| JP | 2001-261959 A | 9/2001 |
| JP | 2003-113307 A | 4/2003 |
| JP | 2003-147200 A | 5/2003 |
| JP | 2003-268236 A | 9/2003 |
| JP | 2006-8846 A | 1/2006 |
| JP | 2006-321977 A | 11/2006 |
| JP | 2007-2221 A | 1/2007 |
| WO | 2006/051658 A1 | 5/2006 |

*Primary Examiner* — Michael C Miggins
(74) *Attorney, Agent, or Firm* — DLA Piper LLP (US)

(57) ABSTRACT

A polyphenylene sulfide resin composition including 100 parts by weight of a resin composition that consists of 99 to 60 wt % of a polyphenylene sulfide resin (a), and 1 to 40 wt % of at least one type of noncrystalline resin (b) selected from the group consisting of polyetherimide resin and polyether sulfone resin and 0.1 to 10 parts by weight of a compound (c) containing at least one group selected from epoxy group, amino group and isocyanate group, wherein the non-crystalline resin (b) forms an island phase and the number-average dispersed particle size of the noncrystalline resin (b) is 1,000 nm or less.

13 Claims, No Drawings

US 8,221,862 B2

POLYPHENYLENE SULFIDE RESIN COMPOSITION, PROCESS FOR PRODUCING THE SAME, AND MOLDED ARTICLE

RELATED APPLICATIONS

This is a §371 of International Application No. PCT/JP2007/055055, with an international filing date of Mar. 14, 2007 (WO 2007/108384 A1, published Sep. 27, 2007), which is based on Japanese Patent Application Nos. 2006-073532, filed Mar. 16, 2006, and 2006-206190, filed Jul. 28, 2006.

TECHNICAL FIELD

This disclosure relates to a polyphenylene sulfide resin composition that is very high in toughness, low in gas emission during thermal melting and high in processability, and also relates to a production process therefor and moldings thereof.

BACKGROUND

Polyphenylene sulfide (hereinafter also referred to as "PPS") resins have good characteristics as engineering plastics including high heat resistance, good barrier properties, high chemical resistance, good electrical insulating properties, and high moist heat resistance, and therefore they have been widely used, mainly in the form of injection moldings and extrusions, as material for different electrical/electronic parts, mechanical parts and automobile components. PPS resins, however, are generally lower in toughness than other engineering plastics such as nylon and PBT, which restricts its uses, and their improvement is now strongly called for.

Studies have been carried out on compositions consisting of a PPS resin and a polyetherimide (hereinafter also referred to as "PEI") resin or a polyether sulfone (hereinafter also referred to as "PES") resin. For instance, JP-HEI-4-130158 (claims) has disclosed a resin composition consisting of a polyarylene sulfide resin, PEI resin, and organic silane compound. This document, however, contains no description that suggests the possibility to achieve a high toughness by using a fine dispersion of a PEI resin. Moreover, it does not address the volume of alcohols that can generate from an organic silane compound when such a resin composition as above is thermally melted. JP-HEI-5-86293 (claims) has disclosed a resin composition consisting of a PPS resin, PEI resin, and a silane coupling agent containing one amino or epoxy group, but gives no description on the possibility of achieving a high toughness by finely dispersing the PEI resin. Moreover, it does not address the volume of alcohols that can generate from a silane coupling agent when such a resin composition as above is thermally melted. JP 2001-261959 (claims) has disclosed a biaxially orientated film with high dielectric strength and good electric characteristics that is produced from a resin composition of PPS and PEI. JP 2001-261959, however, has no description on the addition of a compound that contains at least one of the epoxy group, amino group, and isocyanate group. It gives no description on the possibility of achieving a high toughness by fine dispersion of the PEI resin. Moreover, it does not address the volume of alcohols that can generate from thermal melting. JP 2003-268236 (claims) has disclosed a resin composition consisting of a polyarylene sulfide resin, PEI or PES resin, and graphite, and in a detailed description of the invention, addresses the addition of an alkoxysilane compound containing an isocyanate group. However, any embodiment given in the document contains a description on an alkoxysilane compound containing such an isocyanate group as above, and its effect has not been known. Further, no description is given on the possibility of achieving a high toughness by fine dispersion of the PEI resin. No description is given, moreover, on the volume of alcohols that can generate from an alkoxysilane compound when such a resin composition as above is thermally melted. JP 2003-147200 (claims) has disclosed a resin composition consisting of a polyarylene sulfide resin, PEI resin, carbon black, non-carbon-black non-fiber filler, and fiber filler, and the detailed description of the invention mentions the addition of an alkoxysilane compound that contains an isocyanate group. The embodiments in JP 2003-147200 contain no description on an alkoxysilane compound that contains such an isocyanate group as above, and its effect has not been known. Further, no description is given on the possibility of achieving a high toughness by fine dispersion of the PEI resin. No description is given, moreover, on the volume of alcohols that can generate from an alkoxysilane compound when such a resin composition as above is thermally melted. WO 2006/051658 (claims), which was published after the priority date of this disclosure, discloses a biaxially orientated polyarylene sulfide film with an improved tensile elongation that is produced from PPS and a PEI or PES resin composition, and the addition of an alkoxysilane compound containing an isocyanate group is referred to in a paragraph for detailed description of the invention. No description is given, however, about the volume of alcohols that can generate from the alkoxysilane compound when such a resin composition is thermally melted.

Thus, no document except WO 2006/051658, which was published after the priority date of this disclosure, addresses the possibility that a resin composition with a high tensile elongation (toughness) can be produced from PPS resin containing finely dispersed PEI or PES resin with a number-average dispersed particle size of 1000 nm or less. The above-mentioned documents do not disclose the volume of alcohols that can generate from the alkoxysilane compound when such a resin composition is thermally melted.

It could therefore be helpful to provide a polyphenylene sulfide resin composition that is very high in toughness, low in gas emission during thermal melting and high in processability.

SUMMARY

We discovered that it is helpful to use a compound containing one or more groups selected from epoxy group, amino group and isocyanate group, which is referred to as compound (c), and finely dispersing PEI or PES resin with a number-average dispersed particle size of 1000 nm or less, which is referred to as resin (b), in a PPS, which is referred to as resin (a).

We thus provide:

1. A polyphenylene sulfide resin composition comprising 100 parts by weight of a resin composition that consists of a polyphenylene sulfide resin, which is referred to as resin (a), accounting for 99 to 60 wt % and at least one type of noncrystalline resin selected from polyetherimide resin and polyether sulfone resin, which is referred to as resin (b), accounting for 1 to 40 wt %, the sum of the resin (a) and the resin (b) accounting for 100 wt %, to which 0.1 to 10 parts by weight of a compound containing at least one group selected from epoxy group, amino group and isocyanate group, which is referred to as compound (c), is added, wherein the morphology is characterized in that said noncrystalline resin (b) forms an island phase, the number-average dispersed particle size of said noncrystalline resin (b) being 1,000 nm or less, 2. A production method for a polyphenylene sulfide resin composition comprising 100 parts by weight of a resin composition that consists of a polyphenylene sulfide resin, which is referred to as resin (a), accounting for 99 to 60 wt % and at least one type of noncrystalline resin selected from polyetherimide resin and polyether sulfone resin, which is referred to as resin (b), accounting for 1 to 40 wt %, the sum of the resin (a) and the resin (b) accounting for 100 wt %, to which 0.1 to 10 parts by weight of a compound containing at least one group selected from epoxy group, amino group and isocyanate group, which is referred to as resin (c), is added, wherein a melt-kneading process is carried out, followed by repeating the melt-kneading process one or more times, 3. A production method for a polyphenylene sulfide resin composition comprising 100 parts by weight of a resin composition that consists of a polyphenylene sulfide resin, which is referred to as resin (a), accounting for 99 to 60 wt % and at least one type of noncrystalline resin selected from polyetherimide resin and polyether sulfone resin, which is referred to as resin (b), accounting for 1 to 40 wt %, the sum of the resin (a) and the resin (b) accounting for 100 wt %, to which 0.1 to 10 parts by weight of a compound containing at least one group selected from epoxy group, amino group and isocyanate group, which is referred to as compound (c), is added, wherein 0.02 parts or more of water is added to said polyphenylene sulfide resin (a) and said noncrystalline resin (b), which in total account for 100 parts by weight, during the melting-kneading process, and 4. Moldings produced from a polyphenylene sulfide resin composition of 1 above.

DETAILED DESCRIPTION

We provide a description of our compositions, processes and articles below, including representative examples.
(a) PPS Resin The PPS resin (a) is a polymer comprising a repeating unit as represented by the following structural formula (I):

[Chemical formula 1]

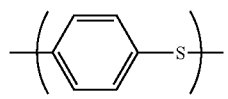

and the polymer should preferably comprise a polymer containing a repeating unit as represented by the above structural formula up to 70 mol % or more, more preferably up to 90 mol % or more to achieve required heat resistance. In the PPS resin (a), less than 30 mol % of the total repeating units may comprise repeating units having a structure as shown below:

[Chemical formula 2]

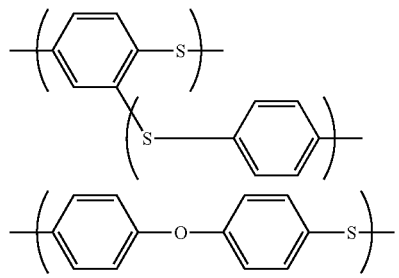

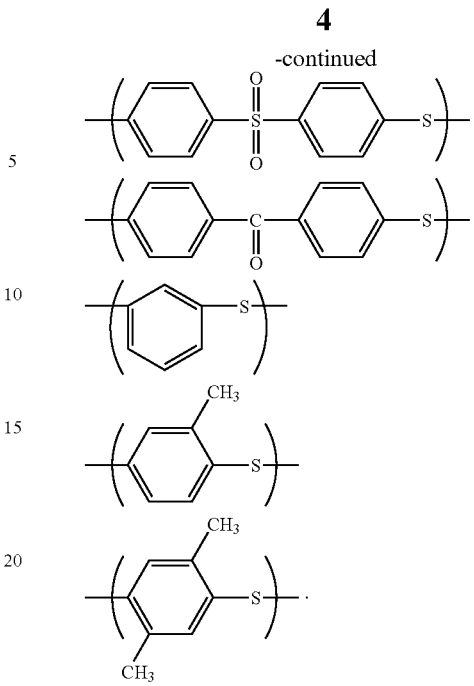

A PPS copolymer partly comprising such a structure has a lower melting point, and therefore, such a resin composition is preferred. There are no specific limitations on the melt viscosity of the PPS resin (a) used in the invention, but a higher melt viscosity is generally preferred to achieve a higher toughness. Typically, it should preferably be more than 80 Pa·s (310° C., shear velocity 1000/s), more preferably 100 Pa·s or more, and still more preferably 150 Pa·s or more. With respect to its maximum, it should preferably be 600 Pa·s or less to allow the melt to maintain a required flowability.

The melt viscosity is measured by a capillograph manufactured by Toyo Seiki Seisaku-sho, Ltd., under the conditions of a temperature of 310° C. and a shear velocity of 1000/s.

A process for producing the PPS resin (a) is described below, although other processes than that illustrated below may also be used as along as the PPS resin (a) having the structure given above can be produced.

First, the polyhalogenated aromatic compound, sulfidizing agent, polymerization solvent, molecular weight modifier, polymerization assistant and polymerization stabilizer used for the production process are described below.
[Polyhalogenated Aromatic Compound]

A polyhalogenated aromatic compound contains two or more halogen atoms in its molecule. Specifically, useful polyhalogenated aromatic compounds include p-dichlorobenzene, m-dichlorobenzene, o-dichlorobenzene, 1,3,5-trichlorobenzene, 1,2,4-trichlorobenzene, 1,2,4,5-tetrachlorobenzene, hexachlorobenzene, 2,5-dichlorotoluene, 2,5-dichloro-p-xylene, 1,4-dibromobenzene, 1,4-diiodobenzene, and 1-methoxy-2,5-dichlorobenzene, of which p-dichlorobenzene is preferred. A copolymer of two or more different polyhalogenated aromatic compounds may be used, but such a copolymer should preferably comprise a p-dihalogenated aromatic compound as primary component.

To obtain a PPS resin (a) with a preferred viscosity for processing, the content of such a polyhalogenated aromatic compound should typically be in the range of 0.9 to 2.0 moles, more preferably 0.95 to 1.5 moles, and still more preferably 1.005 to 1.2 moles, per mole of the sulfidizing agent.

[Sulfidizing Agent]

Useful sulfidizing agents include alkali metal sulfide, alkali metal hydrosulfide, and hydrogen sulfide.

Specifically, useful alkali metal sulfides include, for instance, lithium sulfide, sodium sulfide, potassium sulfide, rubidium sulfide, cesium sulfide, and mixtures of two or more of them, of which sodium sulfide is preferred. These alkali metal sulfides may be used in the form of a hydrate, aqueous mixture or anhydride.

Specifically, useful alkali metal hydrosulfides include, for instance, sodium hydrosulfide, potassium hydrosulfide, lithium hydrosulfide, rubidium hydrosulfide, cesium hydrosulfide, and mixtures of two or more of them, of which sodium hydrosulfide is preferred. These alkali metal hydrosulfides may be used in the form of a hydrate, aqueous mixture or anhydride.

An alkali metal sulfide prepared in situ in the reaction system from an alkali metal hydrosulfide and an alkali metal hydroxide may also be used. An alkali metal sulfide prepared first from an alkali metal hydrosulfide and an alkali metal hydroxide may be transferred into the polymerization tank before use.

Instead of this, an alkali metal sulfide prepared in situ in the reaction system from an alkali metal hydroxide, such as lithium hydroxide and sodium hydroxide, and a hydrogen sulfide may be used. An alkali metal sulfide prepared first from an alkali metal hydroxide, such as lithium hydroxide and sodium hydroxide, and a hydrogen sulfide may be transferred into the polymerization tank before use.

If a loss of part of the sulfidizing agent is caused by dehydration or other such processes before the start of the reaction, the loss is subtracted from the volume of the sulfidizing agent fed to determine its volume actually used.

The sulfidizing agent may be used in combination with an alkali metal hydroxide and/or alkaline earth metal hydroxide. Specifically, preferred alkali metal hydroxides include, for instance, sodium hydroxide, potassium hydroxide, lithium hydroxide, rubidium hydroxide, cesium hydroxide, and mixtures of two or more of them, while useful alkaline earth metal hydroxides include, for instance, calcium hydroxide, strontium hydroxide, barium hydroxide, of which sodium hydroxide is preferred.

If an alkali metal hydrosulfide is used as sulfidizing agent, an alkali metal hydroxide should preferably be used in combination with a content in the range of 0.95 to 1.20 moles, more preferably 1.00 to 1.15 moles, and still more preferably 1.005 to 1.100 moles, per mole of the alkali metal hydrosulfide.

[Polymerization Solvent]

The polymerization solvent should preferably be an organic polarity solvent. Specifically, such solvents include N-alkyl pyrolidone such as N-methyl-2-pyrolidone and N-ethyl-2-pyrolidone; caprolactams such as N-methyl-∈-caprolactam; aprotic organic solvents such as 1,3-dimethyl-2-imidazolidinone, N,N-dimethylacetamide, N,N-dimethylformamide, hexamethylphosphoric triamide, dimethyl sulfone, and tetramethylene sulfoxide; and mixtures of them; all of which are used preferably because they can react very stably. Of these, methyl-2-pyrolidone (hereinafter also referred to as NMP) is used particularly preferred.

The content of the organic polarity solvent should preferably be in the range of 2.0 to 10 moles, more preferably 2.25 to 6.0 moles, and still more preferably 2.5 to 5.5 moles, per mole of the sulfidizing agent.

[Molecular Weight Modifier]

A monohalogen compound (not necessarily an aromatic compound) may be used in combination with the above polyhalogenated aromatic compound in order to form ends in the resulting PPS resin (a) or to adjust its polymerization reaction and molecular weight.

[Polymerization Assistant]

The use of a polymerization assistant is helpful for quick production of a PPS resin (a) with a relatively high polymerization degree. The above-mentioned polymerization assistant is a substance that can serve to produce a PPS resin (a) with an increased viscosity. Specifically, such polymerization assistants include, for instance, organic carboxylate, water, alkali metal chloride, organic sulfonate, alkali metal sulfate, alkaline earth metal oxide, alkali metal phosphate, and alkaline earth metal phosphate. They may be used singly, or two or more of them may be used in combination. Among others, organic carboxylate, water, and alkali metal chloride are preferred, alkali metal carboxylate and lithium chloride being preferred as said organic carboxylate and alkali metal chloride, respectively.

The above alkali metal carboxylate is a compound that is represented by the following general formula: $R(COOM)_n$ (where R denotes an alkyl group with 1 to 20 carbons, cycloalkyl group, aryl group, alkyl aryl group, or aryl alkyl group, M denoting an alkali metal selected from lithium, sodium, potassium, rubidium and cesium, and n denoting an integer in the range of 1 to 3). The alkali metal carboxylate to be used may be in the from of a hydrate, anhydride, or aqueous solution. Specifically, useful alkali metal carboxylates include, for instance, lithium acetate, sodium acetate, potassium acetate, sodium propionate, lithium valerate, sodium benzoate, sodium phenylacetate, p-potassium toluate, and mixtures of them.

The alkali metal carboxylate may be produced by adding about the same chemical equivalents of an organic acid and one or more compound selected from alkali metal hydroxide, alkali metal carbonate, and alkali metal bicarbonate, and allowing them to react. Of such alkali metal carboxylates, lithium salts are expensive though it is high in solubility in the reaction system and can have a high assistant effect, while potassium, rubidium and cesium salts is not sufficiently high in solubility in the reaction system. Thus, sodium acetate is used most preferably because of its moderately high solubility in the polymerization system.

When used as polymerization assistant, the content of these alkali metal carboxylates should typically be in the range of 0.01 to 2 moles per mole of the alkali metal sulfide used, and it should preferably be in the range of 0.1 to 0.6 moles, still more preferably 0.2 to 0.5 moles, to achieve a higher polymerization degree.

When water is used as polymerization assistant, its content should typically be in the range of 0.3 to 15 moles per mole of the alkali metal sulfide used, and it should preferably be in the range of 0.6 to 10 moles, still more preferably 1 to 5 moles, to achieve a higher polymerization degree.

As a matter of course, two or more of these polymerization assistant may be used in combination, and for instance, the combined use of an alkali metal carboxylate and water allows a higher molecular weight to be achieved in a smaller amount than that required when they are used singly.

There are no specific limitations on the timing of the addition of these polymerization assistants, and they may be added during the preprocessing step that is described later, at the start of polymerization, or during the polymerization step. They may be added in lots, but when an alkali metal carboxylate is used as polymerization assistant, it should preferably be added in one lot at the start of the preprocessing step or at the start of the polymerization step because of easy addition operations. If water is used as polymerization assistant, good effects are achieved by adding it during the polymerization step that is performed after the feeding of a polyhalogenated aromatic compound.

[Polymerization Stabilizer]

A polymerization stabilizer may be used to stabilize the polymerization reaction system and prevent side reactions. A polymerization stabilizer contributes to the stabilization of the polymerization reaction system and suppresses undesired side reactions. One of the signs of side reactions is the production of thiophenol, and the addition of a polymerization stabilizer can serve to control the production of thiophenol. Specifically, useful polymerization stabilizers include alkali metal hydroxide, alkali metal carbonate, alkaline earth metal hydroxide, and alkaline earth metal carbonate. Of these, alkali metal hydroxides such as sodium hydroxide, potassium hydroxide, and lithium hydroxide are preferred. The above-mentioned alkali metal carboxylates can be regarded as polymerization stabilizers because they can stabilize the polymerization process. When an alkali metal hydrosulfide is used as sulfidizing agent, the combined use with an alkali metal hydroxide is particularly preferable as described above. Here, the surplus alkali metal hydroxide relative to the amount of the sulfidizing agent can act as polymerization stabilizer. Such polymerization stabilizer may be used singly, or two or more of them may be used in combination.

The polymerization stabilizer used should typically be in the range of 0.02 to 0.2 moles, more preferably 0.03 to 0.1 moles, and still more preferably 0.04 to 0.09 moles, per mole of the alkali metal sulfide fed. A required stabilization effect will not be achieved if the content is too low, whereas its addition in an excessive amount will be economically disadvantageous and lead to a lower polymer yield.

There are no specific limitations on the timing of the addition of these polymerization stabilizers, and they may be added during the preprocessing step that is described later, at the start of polymerization, or during the polymerization step. They may be added in lots, they should preferably be added in one lot at the start of the preprocessing step or at the start of the polymerization step because of easy operations.

Next, preferred production processes for the PPS resin (a) are described concretely, focusing sequentially on the preprocessing step, polymerization reaction step, recovery step, and post-processing step, though, as a matter of course, this disclosure is not limited by this description.

[Preprocessing Step]

In producing the PPS resin (a), the sulfidizing agent is usually used in the form of a hydrate, but preferably, a mixture of an organic polarity solvent and a sulfidizing agent is heated before adding a polyhalogenated aromatic compound to remove excess water out of the system.

As stated previously, a sulfidizing agent may be prepared from an alkali metal hydrosulfide and an alkali metal hydroxide in situ in the reaction system or in a separate tank other than the polymerization tank. There are no specific limitations on this process, but preferably, an alkali metal hydrosulfide and an alkali metal hydroxide are added to an organic polarity solvent in an inert gas atmosphere in the temperature range of room temperature to 150° C., preferably room temperature to 100° C. and heated under atmospheric pressure or reduced pressure up to at least 150° C. or more, preferably up to 180 to 260° C., to evaporate water. A polymerization assistant may be added at this stage. Toluene or other compounds may be added to this reaction to promote the evaporation of water.

The volume of water in the polymerization system for the polymerization reaction should preferably be in the range of 0.3 to 10.0 moles per mole of the sulfidizing agent fed. The volume of water in the polymerization system is calculated by subtracting the volume of water removed out of the polymerization system from the total volume of water fed to the polymerization system. Such water to be fed may be in the form of water, aqueous solutions, or water of crystallization.

[Polymerization Reaction Step]

To produce the PPS resin (a), a polyhalogenated aromatic compound is reacted with a sulfidizing agent in an organic polarity solvent in the temperature range of 200° C. to 290° C.

To start the polymerization reaction step, the organic polarity solvent, the sulfidizing agent and the polyhalogenated aromatic compound are mixed preferably in an inert gas atmosphere preferably in the temperature range of room temperature to 240° C., more preferably 100 to 230° C. A polymerization assistant may be added at this stage. These substances may be added either in random order or at a time.

Such a mixture is heated typically up to the temperature range of 200° C. to 290° C. There are no specific limitations on the heating rate, but heating is performed typically in the range of 0.01 to 5° C. per minute, and preferably in the range of 0.1 to 3° C. per minute.

Typically, the mixture is heated up to a final temperature of 250 to 290° C., and allowed to react typically for 0.25 to 50 hours, preferably 0.5 to 20 hours, at the temperature.

As an effective way of achieving a higher polymerization degree, the reaction may be maintained for a certain period at, for instance, 200 to 260° C. at a stage before the final temperature is reached, followed by heating up to 270 to 290° C.

The time period for the reaction at 200 to 260° C. is typically in the range of 0.25 to 20 hours, and preferably 0.25 to 10 hours.

The polymerization may be carried out in several stages to produce a polymer with a higher polymerization degree. An effective way of carrying out the polymerization in several stages, such stages may be performed above a conversion degree of the polyhalogenated aromatic compound of 40 mol %, preferably 60 mol %, in a system at 245° C.

The conversion degree of the polyhalogenated aromatic compound (referred to as PHA) is calculated by the following equation. The PHA residue can be determined typically by gas chromatography.

(A) In cases where the polyhalogenated aromatic compound is added in an excessive amount in terms of molar ratio relative to the alkali metal sulfide:

Conversion degree=[PHA feed (moles)−PHA residue (moles)]/[PHA feed (moles)−PHA excess (moles)]

(B) In cases other than (A):

Conversion degree=[PHA feed (moles)−PHA residue (moles)]/[PHA feed (moles)]

[Recovery Step]

In the production process for the PPS resin (a), solid material is recovered from the polymerization liquid, which contains polymers and solvents, after the completion of the polymerization. Any known recovery method may be used to recover the PPS resin (a).

For instance, the reaction liquid may be gradually cooled after the completion of the polymerization, followed by recovery of polymer particles. There are no specific limitations on the rate of the gradual cooling, but it is typically about 0.1 to 3° C. per minute. It is not necessary to cool the liquid at a constant rate over the entire cooling step, but cooling may be performed at a rate of, for instance, 0.1 to 1° C. per minute before the start of crystal deposition, and at 1° C. or more per minute subsequently.

Quenching the liquid followed by recovery is also a preferable method, and flushing is a preferred way of performing this recovery method. Specifically, the polymerization reaction liquid maintained under high-temperature, high-pressure conditions (typically at 250° C. or more, 8 kg/cm² or more) is allowed to spout into an atmosphere under atmospheric pressure or reduced pressure, so that the polymer is recovery as particles while the solvent is recovered at the same time. The term flushing means allowing the polymerization liquid to spout through a nozzle. The atmosphere for such flushing may be, for instance, a nitrogen or steam atmosphere under atmospheric pressure, and its temperature is typically in the range of 150 to 250° C.

[Post-Processing Step]

The PPS resin (a) resulting from the above polymerization and recovery steps may be subjected to acid treatment, hot-water treatment or cleaning with an organic solvent.

Acid treatment to be performed may be as follows. There are no specific limitations on the acid to be used for the acid treatment of the PPS resin (a), unless it can act to decompose the PPS resin (a). Useful acids include acetic acid, hydrochloric acid, sulfuric acid, phosphoric acid, silicic acid, carbonic acid, and propyl acid, of which acetic acid and hydrochloric acid are preferred. Acids such as nitric acid that can decompose or degrade the PPS resin (a) are not preferred.

For such acid treatment, the PPS resin (a) may be immersed in an acid or aqueous acid solution, and the liquid may be stirred or heated as required. If acetic acid is used, for instance, good effect is achieved by immersing powder of the PPS resin in an aqueous solution with a pH of 4 heated at 80 to 200° C. and stirred for 30 minutes. The solution after the treatment may have a pH of above 4, or for instance in the range of 4 to 8. The PPS resin (a) subjected to acid treatment should preferably be washed several times in water or hot water to remove the remaining acids and salts. The water to be used for the washing should preferably be distilled water or deionized water in order to prevent the preferred chemical alteration of the PPS resin (a) achieved by acid treatment from being injured.

Hot-water treatment should be carried out as follows. During the hot-water treatment of the PPS resin (a), the temperature of the hot water should preferably be 100° C. or more, more preferably 120° C. or more, still more preferably 150° C. or more, and still more preferably 170° C. or more. A temperature of lower than 100° C. is not preferred because the preferred chemical alteration of PPS resin (a) will not be achieved to a required degree.

To achieve the preferred chemical alteration of the PPS resin (a), the water to be used for the hot water washing should preferably be distilled water or deionized water. There are no specific limitations on the operations of the hot-water treatment, and the treatment may be carried out by, for instance, pouring a required volume of the PPS resin (a) in a required volume of water, followed by heating and stirring in a pressure vessel, or by continuous implementation of the hot-water treatment. With respect to the proportion between the PPS resin (a) and water, the volume of water should preferably be larger, and a bath ratio of 200 g or less of the PPS resin (a) to one liter of water is preferred.

With respect to the atmosphere for the treatment, an inert atmosphere is preferred in order to avoid the decomposition of the end groups, which is not desirable. Furthermore, it is preferred that the PPS resin (a) after the hot-water treatment should preferably be washed in warm water to remove residual matters.

Washing with an organic solvent is performed as follows. There are no specific limitations on the organic solvent to be used for the washing of the PPS resin (a) unless it will act to decompose the PPS resin (a), and useful ones include, for instance, nitrogen-containing polar solvents such as N-methyl-2-pyrolidone, dimethyl formamide, dimethyl acetamide, 1,3-dimethyl imidazolidinone, hexamethylphosphorus amide, and piperazinones; sulfoxide or sulfone-based solvents such as dimethyl sulfoxide, dimethyl sulfone, and sulfolane; ketone-based solvent such as acetone, methyl ethyl ketone, diethyl ketone, and acetophenone; ether-based solvents such as dimethyl ether, dipropyl ether, dioxane, and tetrahydrofuran; halogen-based solvents such as chloroform, methylene chloride, trichloroethylene, ethylene dichloride, perchloroethylene, monochloroethane, dichloroethane, tetrachloroethane, perchloroethane, and chlorobenzene; alcohols and phenol-based solvents such as methanol, ethanol, propanol, butanol, pentanol, ethylene glycol, propylene glycol, phenol, creosol, polyethylene glycol, and polypropylene glycol; and aromatic hydrocarbon-based solvents such as benzene, toluene, and xylene. Of these organic solvents, N-methyl-2-pyrolidone, acetone, dimethyl formamide and chloroform are particularly preferred. These organic solvents, furthermore, may be used singly, or two or more of them may be used in combination.

The washing in the organic solvent may be carried out by, for instance, immersing the PPS resin (a) in the organic solvent, and stirring or heating may also be performed as required. There are no specific limitations on the washing temperature for washing the PPS resin (a) in the organic solvent, and the washing may be performed in the range of room temperature to about 300° C. The washing efficiency tends to increase with a washing temperature, but a sufficient effect of washing can be usually achieved at a washing temperature in the range of room temperature to 150° C. The washing can also be performed under pressure in a pressure vessel at above the boiling point of the organic solvent. In addition, there are no specific limitations on the washing time. Depending on the washing conditions, a sufficient effect is achieved by washing for five minutes or more by batch washing. Continuous washing is also useful.

The PPS may contain a salt of an alkaline earth metal such as Ca. Such an alkaline earth metal salt may be introduced by, for instance, adding the alkaline earth metal salt before said preprocessing step, during preprocessing step or after preprocessing step, by adding an alkaline earth metal salt in the polymerization tank, before the polymerization step, during polymerization step or after polymerization step, or by adding an alkaline earth metal salt at the beginning, in the middle or at the end of said washing step. Of these, the easiest way is adding the alkaline earth metal salt after removing residual oligomers and residual salts by washing in an organic solvent, warm water or hot water. It is preferred that the alkaline earth metal salt is introduced in the PPS in the form of an alkaline earth metal ion such as acetate, hydroxide, and carbonate. The excess alkaline earth metal salt should preferably be removed by, for instance, washing in warm water. When the alkaline earth metal ion is introduced, the content of the alkaline earth metal ion should preferably be 0.001 mmol or more, more preferably 0.01 mmol or more, per gram of the PPS. The temperature for this should preferably be 50° C. or more, more preferably 75° C. or more, and still more preferably 90° C. or more. There are no specific limitations on the maximum temperature limit, but a temperature of 280° C. or lower is usually preferred from the viewpoint of operability. The bath ratio (weight of washing fluid relative to that of dry PPS) should preferably be 0.5 or more, more preferably 3 or more, and still more preferably 5 or more.

The molecular weight of the PPS resin (a) may be increased by performing thermal-oxidation crosslinking treatment such as heating the material in an oxygen atmosphere after the completion of the polymerization or heating the material after a crosslinking such as a peroxide is added.

If dry heat treatment is performed to increase the molecular weight by thermal-oxidation crosslinking, the temperature used should preferably be 160 to 260° C., more preferably 170 to 250° C. The concentration of oxygen should preferably be 5% by volume or more, more preferably 8% by volume or more. There are no specific limitations on the upper limit of the oxygen concentration, but the practical maximum is about 50% by volume. The treatment time should preferably be in the range of 0.5 to 100 hours, more preferably 1 to 50 hours, and still more preferably 2 to 25 hours. The heat treatment apparatus may be an ordinary hot air dryer, a rotation type heater, or a heater with a stirring blade, of which the rotation type heater and the stirring blade type heater are preferred because they are efficient and can achieve uniform treatment.

Dry heat treatment may be performed with the aim of controlling the thermal-oxidation crosslinking and removing the volatile matter. The temperature for this should preferably be in the range of 130 to 250° C., more preferably 160 to 250° C. The oxygen concentration for this should preferably be less than 5% by volume, more preferably less than 2% by volume. The treatment time should preferably be in the range of 0.5 to 50 hours, more preferably 1 to 20 hours, and still more preferably 1 to 10 hours. The heat treatment apparatus may be an ordinary hot air dryer, a rotation type heater, or a heater with a stirring blade, of which the rotation type heater and the stirring blade type heater are preferred because they are efficient and can achieve uniform treatment.

The PPS resin (a) to be used should preferably be a virtually straight-chain polymer that is not crosslinked by thermal oxidation with the aim of increasing the molecular weight to achieve a required toughness. Useful materials as the PPS resin (a) for the invention include Toray Industries M2588, M2888, M2088, T1881, L2120, L2480, M2100, M2900, E2080, E2180, and E2280.

(b) Polyetherimide Resin and Polyether Sulfone Resin

As the noncrystalline resin, at least one selected from polyetherimide resins and polyether sulfone resins is used as described previously, but use of polyetherimide resins is preferred because a small amount of them can be effective to achieve a high toughness. For the polyetherimides, there are no specific limitations if they are polymers that consist of aliphatic, alicyclic or aromatic ether units and cyclic imide groups as repeating units and can be melt-processed. Their polyetherimide backbone chain may contains structural units other than cyclic imide or ether bonds, such as aromatic, aliphatic or alicyclic ester units and oxycarbonyl units, unless they have adverse influence of the effect of the invention.

Specifically, preferred polyetherimides are those polymers which are represented by the following general formula:

[Chemical formula 3]

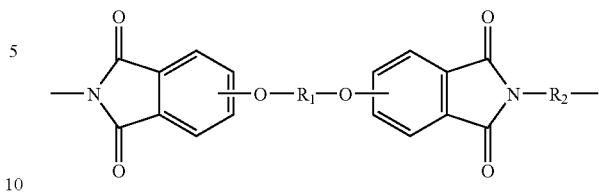

where $R_1$ represents a divalent aromatic residue containing 6 to 30 carbon atoms, $R_2$ a divalent organic group selected from aromatic residues containing 6 to 30 carbon atoms, alkylene groups containing 2 to 20 carbon atoms, cycloalkylene groups containing 2 to 20 carbon atoms, and polydiorganosiloxane groups containing 2 to 8 carbon atoms and chain-stopped with alkylene groups. As the above $R_1$ and $R_2$, units comprising an aromatic residue as represented by the following formulae, for instance, are preferred.

[Chemical formula 4]

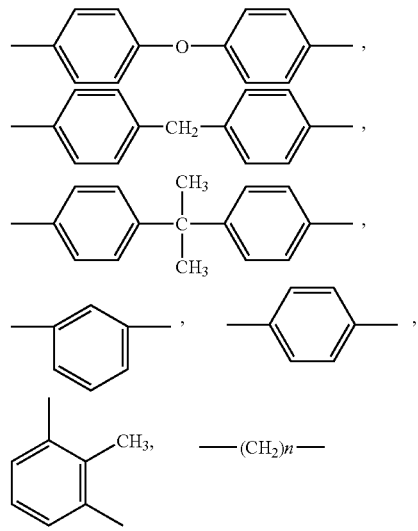

For the present invention, a condensation product of a 2,2-bis[4-(2,3-dicarboxyphenoxy)phenyl]propane dianhydride comprising structural units as represented by the following formulae and either a m-phenylene diamine or a p-phenylene diamine is preferred from the viewpoint of melting moldability and required costs. Such polyetherimides are commercially available from General Electric Company under the brand name of Ultem.

[Chemical formula 5]

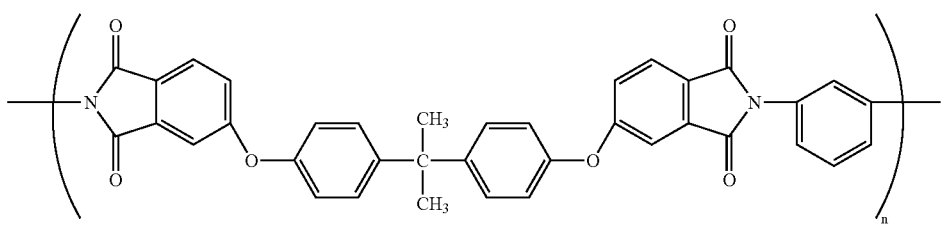

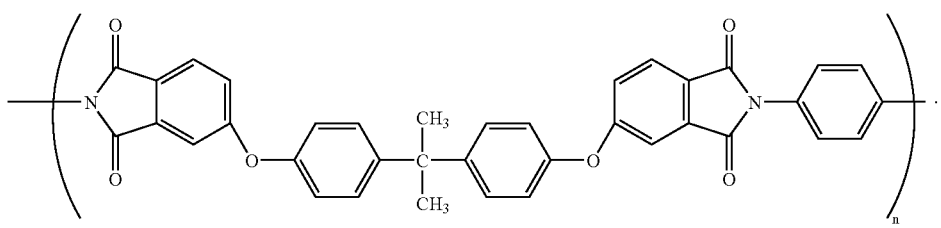

[Chemical formula 6]

The polyether sulfone used in the invention is a resin comprising repeating backbone units that contain a sulfone bond and an ether bond.

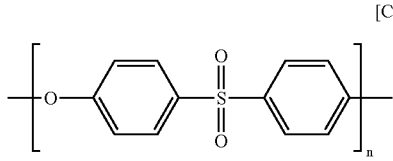

[Chemical formula 7]

These compounds are commercially available under the brand name of Victrex PES or Sumikaexcel.

(c) a Compound Comprising One or More of Epoxy Group, Amino Group, and Isocyanate Group It is necessary to add a compound comprising one or more of epoxy group, amino group, and isocyanate group, which is referred to as compound (c), that acts as compatibility improver with the aim of stably maintaining a high toughness.

Useful epoxy-containing compounds include glycidyl ethers of a bisphenol such as bisphenol A, resorcinol, hydroquinone, pyrocatechol, bisphenol F, saligenin, 1,3,5-trihydroxybenzene, bisphenol S, trihydroxydiphenyl dimethyl methane, 4,4'-dihydroxybiphenyl, 1,5-dihydroxynaphthalene, cashew phenol, and 2,2,5,5-tetrakis(4-hydroxyphenyl) hexane, those comprising a halogenated bisphenol instead of a bisphenol as listed above, glycidyl ether based epoxy compounds such as diglycidyl ether comprising a butanediol, glycidyl ester based compounds such as glycidyl phthalate, glycidyl epoxy resins such as glycidyl amine based compounds comprising N-glycidyl aniline etc., linear epoxy compounds such as epoxidized polyolefine and epoxidized soybean oil, and cyclic non-glycidyl epoxy resins such as vinyl cyclohexene dioxide and dicyclopentadiene dioxide.

In addition, novolac-type epoxy resins can also be useful. Novolac-type epoxy resin comprises two or more epoxy groups and is produced typically by allowing novolac-type phenol resin to react with epichlorohydrin. A novolac-type phenol resin is produced through condensation reaction of a phenol and formaldehyde. There are no specific limitations on the phenol to be used as raw material, and useful ones include phenol, o-creosol, m-creosol, p-creosol, bisphenol A, resorcinol, p-tertiary butylphenol, bisphenol F, bisphenol S, and condensation products of them.

Furthermore, olefin copolymers containing an epoxy group can also be useful. Such olefin copolymers containing an epoxy group (epoxy-containing olefin copolymers) include olefin copolymers that are produced by introducing an epoxy-containing monomer component into an olefin-based (co)polymer. Copolymers that are produced from an olefin-based polymer containing a double bond in its backbone chain by epoxidizing the double bond portion.

Useful units containing a functional group that serves to introduce an epoxy-containing monomer component into an olefin-based (co)polymer include epoxy-containing monomers such as glycidyl acrylate, glycidyl methacrylate, glycidyl ethacrylate, glycidyl itaconate, and glycidyl citraconate.

There are no specific limitations on the method used to introduce these epoxy-containing components, and useful ones include copolymerization with an α-olefin, and graft introduction into an olefin (co)polymer using a radical initiator.

The content of the epoxy-containing monomer introduced should preferably be 0.001 to 40 mol %, more preferably 0.01 to 35 mol %, of the total monomers used as raw material to produce the epoxy-containing olefin-based copolymer.

Particularly preferred epoxy-containing olefin copolymers include olefin-based copolymers produced from an α-olefin and a glycidyl ester of an α,β-unsaturated carboxylic acid as copolymerization units. Such preferred α-olefins include ethylene. These copolymers may be further copolymerized with an α,β-unsaturated carboxylic acid or its alkyl ester such as acrylic acid, methyl acrylate, ethyl acrylate, butyl acrylate, methacrylic acid, methyl methacrylate, ethyl methacrylate, and butyl methacrylate, as well as styrene and acrylonitrile.

These olefin copolymers may be random, alternating, block, or graft copolymers.

Of said olefin copolymers produced by copolymerization of an α-olefin and a glycidyl ester of an α,β-unsaturated carboxylic acid, those comprising 60 to 99 wt % of an α-olefin and 1 to 40 wt % of an glycidyl ester of an α,β-unsaturated carboxylic acid are particularly preferred.

Specifically, such glycidyl esters of an α,β-unsaturated carboxylic acid include glycidyl acrylate, glycidyl methacrylate, and glycidyl ethacrylate, of which glycidyl methacrylate is preferred.

Useful olefin-based copolymers comprising, as essential copolymerization components, an α-olefin and a glycidyl ester of an α,β-unsaturated carboxylic acid include ethylene/propylene-g-glycidyl methacrylate copolymer ("g" representing "graft," the same applying hereinafter), ethylene/butene-1-g-methglycidyl acrylate copolymer, ethylene-glycidyl methacrylate copolymer-g-polystyrene, ethylene-glycidyl methacrylate copolymer-g-acrylonitrile-styrene copolymer, ethylene-glycidyl methacrylate copolymer-g-PMMA, ethylene/glycidyl acrylate copolymer, ethylene/glycidyl methacrylate copolymer, ethylene/methyl acrylate/glycidyl methacrylate copolymer, and ethylene/methyl methacrylate/glycidyl methacrylate copolymer.

In addition, alkoxysilanes containing an epoxy group are also useful. Specifically, such compounds include epoxy-containing alkoxysilane compounds such as γ-glycidoxypropyl trimethoxysilane, γ-glycidoxypropyl triethoxysilane, and β-(3,4-epoxy cyclohexyl)ethyl trimethoxysilane.

Useful amino-containing compounds include amino-containing alkoxysilanes. Specifically, such compounds include amino-containing alkoxysilane compounds such as γ-(2-aminoethyl)aminopropyl methyl dimethoxysilane, γ-(2-aminoethyl)aminopropyl trimethoxysilane, and γ-aminopropyl trimethoxysilane.

Useful compounds containing one or more isocyanate groups include isocyanate compounds such as 2,4-tolylene diisocyanate, 2,5-tolylene diisocyanate, diphenylmethane-4,4'-diisocyanate, and polymethylene polyphenyl polyisocyanate, and isocyanate-containing alkoxysilane compounds such as γ-isocyanate propyl triethoxysilane, γ-isocyanate propyl trimethoxysilane, γ-isocyanate propyl methyl dimethoxysilane, γ-isocyanate propyl methyl diethoxysilane, γ-isocyanate propyl ethyl dimethoxysilane, γ-isocyanate propyl ethyl diethoxysilane, and γ-isocyanate propyl trichlorosilane.

In particular, the use of at least one compound selected from the compounds containing one or more isocyanate groups and compounds containing two or more epoxy groups is preferred to stably maintaining a high toughness, and alkoxysilanes containing an isocyanate group are more preferred.

The mix proportion of the PPS resin (a) and the polyetherimide resin and/or polyether sulfone resin (b) should preferably be in the range of (a)/(b)=99 to 60 wt %/1 to 40 wt %, more preferably (a)/(b)=97 to 70 wt %/2 to 30 wt %, and still more preferably (a)/(b)=95 to 80 wt %/2 to 20 wt %, the sum of (a) and (b) accounting for 100 wt %. A sufficiently high toughness will not be achieved if the PPS resin (a) accounts for more than 99 wt %, and the melt flowability will be too low if the PPS resin (a) accounts for less than 60 wt %.

The content of the component (c) should preferably be in the range of 0.05 to 10 parts by weight, more preferably 0.1 to 5 parts by weight, still more preferably 0.2 to 3 parts by weight, relative to the sum of the polyphenylene sulfide resin (a) and the noncrystalline resin (b) that accounts for 100 parts by weight. A sufficiently high toughness will not be maintained stably if the component (c) accounts for less than 0.05 parts by weight, and the melt flowability will be too low if the component (c) accounts for more than 10 parts by weight.

The PPS resin composition has a high toughness in addition to the excellent heat resistance, chemical resistance, and barrier properties that the PPS resin (a) originally possesses. For such characteristics to develop, it should have such a morphological feature that the PPS resin (a) forms a sea phase (continuous phase or matrix) while the polyetherimide resin and/or polyether sulfone resin (b) form an island phase (dispersed phase). It is essential, furthermore, for the polyetherimide resin and/or polyether sulfone resin (b) to have a number-average dispersed particle size of 1000 nm or less, preferably 700 nm or less, and more preferably 500 nm or less. Its minimum should preferably be 1 nm or more to maintain a sufficient productivity. The toughness will be too low if the number-average dispersed particle size of the polyetherimide resin and/or polyether sulfone resin (b) is more than 1000 nm.

Even when recycled, the PPS resin composition stably maintains a high toughness. For such characteristics to develop, it is preferred that the PPS resin (a) and the polyetherimide resin and/or polyether sulfone resin (b) maintains a sea phase (continuous phase or matrix) and an island phase (dispersed phase), respectively, if fragments of a broken injection-molded product are injection-molded again. Furthermore, the number-average dispersed particle size of the polyetherimide resin and/or polyether sulfone resin (b) should preferably be 1000 nm or less, more preferably 700 nm or less, and still more preferably 500 nm or less. Its minimum should preferably be 1 nm or more to maintain a sufficient productivity.

The number-average dispersed particle size referred to here is determined as follows: prepare a ASTM No. 4 sample by molding the PPS resin (a) at a temperature +20° C. above the melting peak temperature, cut out a specimen of 0.1 µm or less at −20° C. from the central portion in the cross sectional direction of the dumbbell sample, observe it at a magnification of 10,000 to 20,000 under a Hitachi, Ltd., H-7100 transmission electron microscope (resolution (particle image) 0.38 nm, magnifying power 500,000 to 600,000), select appropriately 100 dispersed phase portions of the polyetherimide resin and/or polyether sulfone resin (b), measure each portion's maximum and minimum diameters to determine the average as its dispersed particle average size, and calculate the average over all portions to determine the number-average dispersed particle size.

Such a resin composition comprising an alkoxysilane-containing compound can release alcohol as a result of hydrolysis of the alkoxysilane during melt processing. For the PPS resin composition, the volume of the lower alcohols with 1 to 4 carbon atoms generated during thermal melting in a vacuum at 350° C. for 30 minutes should preferably be 0.6 mmol % or less, more preferably 0.4 mmol % or less, still more preferably 0.3 mmol % or less, and still more preferably 0.25 mmol % or less, relative to the weight of the PPS resin composition. By controlling the alcohol generation at 0.6 mmol % or less, the volume of volatile constituents generated from molding of film, sheets or tubes can be decreased to prevent the formation of voids in the molded material. This, in turn, serves to prevent breakage of the film and bulging of the molded material that can result from the voids, thus improving the efficiency of continuous production.

The volume of generated alcohols is determined as follows: dry the PPS resin composition by leaving it overnight in a hot air flow at 130° C., vacuum-encapsulate it in a glass ampule, heat it in a tubular furnace, and collect it, followed by measurement. The size of the glass ampule should consists of a body portion of 100 mm×25 mm and a neck portion of 255 mm×12 mm, both with a thickness of 1 mm. Specifically, quantitative determination of the alcohol generation should be carried out as follows: vacuum-encapsulate 3 g of the PPS resin composition in a glass ampule, insert only the body portion of the ampule into a tubular furnace (ceramic tubular electric furnace ARF-30K manufactured by Asahi Rika Manufacturing) at 350° C., and heat it for 30 minutes to allow the volatilized gas to be cooled and liquefied in the neck portion of the ampule that is not heated by the tubular furnace. The neck portion is cut out and the gas left is recovered by dissolving it in 4 g of N-methyl-2-pyrolidone (NMP). Then the NMP solution of the collected gas is separated and measured by gas chromatography using Shimadzu Corporation GC-14A to determine the volume of the generated alcohols.

A preferred method for producing a resin composition that does not generate a large amount of alcohols is to carrying out a melting-kneading process using a biaxial extruder has at least two kneading units, followed by carrying the melting-kneading process one or more times. When the PPS resin (a) and the PEI resin and/or PES resin (b) are subjected to the melting-kneading process, it is also preferred to add 0.02 part by weight or more of water relative to the total amount of water that accounts for 100 parts by weight. This method works to accelerate the hydrolysis of the alkoxysilane compound and serves to further decrease the alcohol generation from the resulting resin composition. There are no specific limitations on the way of adding water, but water may be side-fed in the middle of the extruder using liquid feeding equipment such as gear pump and plunger pump, or water may be added or side-fed in the middle of the extruder during the repeated melting-kneading process following the first melting-kneading process. Other preferred methods include providing five or more kneading units to increase the kneading performance and using an extruder with a large kneading length, and it is not always necessary to repeat the kneading process two or more times or add water.

(d) Inorganic Filler

The PPS resin composition may contain an inorganic filler (d), which is not an essential component, unless it has adverse influence. Specifically, such inorganic fillers (d) include fibrous fillers such as glass fiber, carbon fiber, carbon nanotube, carbon nanohorn, potassium titanate whisker, zinc oxide whisker, calcium carbonate whisker, walastenite whisker, aluminum borate whisker, aramid fiber, alumina fiber, silicon carbide fiber, ceramic fiber, asbestos fiber, gypsum fiber, and metal fiber; silicates such as fullerene, talc, walastenite, zeolite, sericite, mica, kaolin, clay, pyrophyllite, silica, bentonite, asbestos, and alumina silicate; metal compounds such as silicon oxide, magnesium oxide, alumina, zirconium oxide, titanium oxide, and iron oxide; carbonates such as calcium carbonate, magnesium carbonate, and dolomite; sulfates such as calcium sulfate and barium sulfate; hydroxides such as calcium hydroxide, magnesium hydroxide, and aluminum hydroxide; and non-fibrous fillers such as glass beads, glass flakes, glass powder, ceramic beads, boron nitride, silicon carbide, carbon black and silica, graphite; of which glass fiber, silica, and calcium carbonate are preferred, calcium carbonate and silica being particularly preferred because of their corrosion prevention and lubricating properties. These inorganic fillers (d) may be hollow, and two or more of them may be used in combination. Furthermore, these inorganic fillers (d) may be subjected to preliminary treatment with a coupling agent that comprises an isocyanate-based compound, organic silane-based compound, organic titanate-based compound, organic borane-based compound and epoxy compound. In particular, calcium carbonate, silica, and carbon black are preferred because they serve to enhance the corrosion prevention, lubricating and conductive properties.

The content of these inorganic fillers should be 30 parts by weight or less, preferably less than 10 parts by weight, more preferably less than 1 part by weight, and still more preferably 0.8 part by weight or less, relative to the sum of said polyphenylene sulfide resin (a) and said noncrystalline resin (b) that accounts for 100 parts by weight. There are no requirements for the minimum of the content, but it should preferably be 0.0001 part by weight or more. Addition of such inorganic fillers can serve effectively to improve the elastic modulus of the material, but the toughness will largely decrease if their content is larger than 30 parts by weight. The content of said inorganic fillers may be changed according to the balance between toughness and rigidity required in the material.

(e) Other Additives

Moreover, the PPS resin composition may contain a resin other than the polyetherimide resin and polyether sulfone resin unless it has adverse influence on the effect of the invention. Specifically, useful resins include olefin-based polymers and copolymers that do not contain an epoxy group such as polyamide resin, polybutylene terephthalate resin, polyethylene terephthalate resin, modified polyphenylene ether resin, polysulfone resin, polyallyl sulfone resin, polyketone resin, polyallylate resin, liquid crystal polymer, polyether ketone resin, polythioether ketone resin, polyether ether ketone resin, polyimide resin, polyamide-imide resin, polytetrafluoroethylene resin, and ethylene/butene copolymer.

Compounds as described below may also be added for property modification. Thus, following ones may be added: plasticizers such as polyalkylene oxide oligomer based compounds, thioether-based compounds, ester-based compounds, and organic phosphorus based compounds; crystal nucleating agents such as organic phosphorus compounds and polyether ether ketone; metal soap such as montanic acid wax, lithium stearate, and aluminum stearate; mold releasing agents such as ethylene diamine/stearic acid/sebacic acid condensation polymerization products and silicone-based compounds; color protection agents such as hypophosphite; and other common additives such as water, lubricant, ultraviolet ray protection agents, coloring agents, and foaming agent. For any of the above compounds, the content should preferably be 10 wt % or less, more preferably 1 wt % or less, whereas a content of more than 20 wt % relative to the entire composition will have an adverse influence on the compound characteristics of the PPS resin (a).

Kneading Method

In a typical melting-kneading process, the PPS resin (a) is fed to a generally known melting-kneading apparatus such as uniaxial or biaxial extruder, Banbury mixer, kneader, and mixing roll, and kneaded at a temperature +5 to 100° C. above the melting peak temperature. The use of a biaxial extruder, which can exert a relatively shearing force, is preferred in order to achieve fine dispersion of the polyetherimide resin and/or polyether sulfone resin (b). Specifically, it is preferred to use a biaxial extruder with a L/D (L: screw length, D: screw diameter) of 20 or more that comprises two or more kneading units and knead the resin at a screw rotation rate of 100 to 500 rotations/min at a mixing temperature +10 to 70° C. above the melting peak temperature of the PPS resin (a). There are no specific limitations on the order of material mixing during this process, and mixing may be carried out by performing said melting-kneading process after mixing all materials, first performing said melting-kneading process after mixing some of the materials and subsequently another melting-kneading process for the remaining materials, or first mixing some of the materials and subsequently supplying the remaining materials through a side feeder during melting-kneading in a biaxial extruder. As a matter of course, major components may be first kneaded as described above and then pelletized, followed by addition of other minor additives immediately before molding.

For the production of the PPS resin composition, it is preferred, as described previously, to carry out the melting-kneading process followed by carrying out the same melting-kneading process subsequently one or more times in order not only to decrease the alcohol generation from the melting of the resulting resin composition but also to achieve finer dispersion of the polyetherimide resin and/or polyether sulfone resin (b). There are no specific limitations on the maximum number of repetition of the kneading process, but it is preferred for the kneading to be carried out once to three times more after the first implementation of the melting-kneading process from the viewpoint of toughness improvement and economic efficiency.

It is also possible that the amorphous resin selected from the polyetherimide resin and/or polyether sulfone resin (b) is used in a high content and that the polyphenylene sulfide resin (a) is added during the repeated melting-kneading process carried out one or more times after the first melting-kneading process to produce the PPS resin composition so that the amorphous resin (b) is diluted to an intended content. In this case, further additional implementation of the kneading one or more times instead of the dilution with the polyphenylene sulfide resin (a) is economically preferred because this requires less kneading operation as compared with the case where a PPS resin composition the same constitution is produced. It is also possible that a polyphenylene sulfide resin (a) with a different viscosity is added during the additional melting-kneading process carried out one or more times in order to control appropriately the flowability of the final PPS resin composition to be produced.

It is more preferred to add 0.02 part by weight or more of water during the melting-kneading process relative to the sum of the PPS resin (a) and the polyetherimide resin and/or polyether sulfone resin (b) that accounts for 100 parts by weight. If 0.02 part by weight or more of water is added, not only the alcohol generation from the melting of the resulting resin composition is decreased as described previously, but also the impurities originating from the oligomers and by-products in the PPS resin composition of the invention will be removed easily, leading to improved moldability of the melt that is processed into film, sheets, tubes, or other various moldings.

The volume of water to be added should preferably be 0.02 part by weight or more, more preferably 0.5 part by weight or more, and still more preferably 1.0 part by weight or more. There are no specific limitations on the maximum volume of water to be added, but it should preferably be less than 5 parts by weight from the viewpoint of the kneadability and the pressure increase in the extruder due caused by water vapor.

There are no specific limitations on the timing of water addition, but it is preferred to add water after the compound containing at least one group selected from the epoxy group, amino group and isocyanate group (c) has reacted with the polyphenylene sulfide resin (a) or the noncrystalline resin (b), and, it is particularly preferred to add water during the repeated melting-kneading process carried out one or more times after the first melting-kneading process. There are no specific limitations on the way of adding water, but water may be side-fed in the middle of the extruder using liquid feeding equipment such as gear pump and plunger pump, or water may be added or side-fed in the middle of the extruder during the repeated melting-kneading process carried out one or more times following the first melting-kneading process.

The polyphenylene sulfide resin composition is a resin composition with a high toughness, but as a rough standard, it should preferably have a tensile elongation of 80% or more, more preferably 100% or more, when measured with a ASTM No. 4 dumbbell specimen (using Tensilon UTA2.5T tensile tester with a chuck distance of 64 mm and a tension speed of 10 mm/min).

The PPS resin composition has a very high toughness and has a high processability because of smaller gas emission during thermal melting, and therefore, it is particularly useful for extrusion molding to produce film, sheets, and fiber as well as for injection molding. Moreover, the PPS resin composition also has barrier properties against automobile fuel as well as high toughness. Therefore, it is useful to produce tubular extrusion moldings, it is particular preferred as material to produce tubes to transport automobile fuel. Such tubes may be preferably used to produce multilayer tubes with the outer surface reinforced with a PPS resin etc. with a different constitution. With such food characteristics, it is suitable for producing general appliances, pipes for automobiles, tubes, structures such as cases, metal insert moldings for electric and electronic uses, electric insulation film for motors, speaker diaphragms, and vapor-deposited film for film capacitors.

A typical process to produce film through melt-processing of the PPS resin composition is described below, but as a matter of course, the disclosure is not limited to this process. Specifically, pellets of the PPS resin composition are vacuum-dried at 180° C. for 3 hours or more, and then melted in an extruder. Subsequently, it is passed through a filter and discharged from the orifice of a T-die into a sheet. This sheet is allowed to come in contact with a cooling drum for cooling and solidification to provide a virtually non-oriented, unstretched film.

The unstretched film is then biaxially orientated by biaxial stretching. The stretching may be carried out by sequential biaxial stretching, simultaneous biaxial stretching, or their combination.

The biaxially stretched film is then heat-fixed while being kept under tension or relaxed in the width direction, and cooled down to room temperature while being relaxed if required, followed by winding up to provide biaxially orientated film with a thickness of 1 µm to 150 µm.

A typical process for processing the PPS resin composition to produce a multilayer tube is described below, though as a matter of course, the invention is not limited to this process. Specifically, one of the useful methods is a co-extrusion process in which molten resin is supplied from an extruder into a tubular die and extruded into a multilayer tube.

EXAMPLES

Representative examples are described more specifically below.

The material characteristics used in the examples given below were determined by the following methods.

[Injection Molding (1st Time)]

A Sumitomo-Netstal SG75 injection molding machine is used under the conditions of a resin temperature of 310° C. and a die temperature of 150° C. to provide an ASTM No. 4 dumbbell specimen.

[Injection Molding (2nd Time)]

The ASTM No. 4 dumbbell specimen obtained from the first injection molding was crushed in a crusher into rectangular pieces of about 1 to 5 mm. These pieces were processed with a Sumitomo-Netstal SG75 injection molding machine under the conditions of a resin temperature of 310° C. and a die temperature of 150° C. to provide an ASTM No. 4 dumbbell specimen.

[Tensile Test]

Measurements were made with a Tensilon UTA2.5T tensile tester under the conditions of a chuck distance 64 mm and a tension speed of 10 mm/min. The specimen obtained from the first injection molding was used for the test.

[Morphological Observation]

A central portion of the ASTM No. 4 dumbbell specimen is cut in the direction perpendicular to the flow of the resin, and a thin specimen of 0.1 µm or less is cut out at −20° C. from the central region of its cross section, followed by measurement of the diameter of the dispersed particles at a magnification of 10,000 to 20,000 under a Hitachi, Ltd., H-7100 transmission electron microscope (resolution (particle image) 0.38 nm, magnifying power 500,000 to 600,000).

[Alcohol Generation]

A 3 g amount of PPS resin composition pellets dried overnight in hot air of 130° C. is weighed into a glass ampule consisting of a body portion of 100 mm×25 mm and a neck portion of 255 mm×12 mm, both with a thickness of 1 mm, and then vacuum-encapsulated. Only the body portion of the ampule was inserted into a ceramic tubular electric furnace ARF-30K manufactured by Asahi Rika-Manufacturing) and heated at 350° C. for 30 minutes. After taking out the ampule, the neck portion of the ampule that was not heated by the tubular furnace and contained liquefied volatile gas was cut out with a file. Then the liquefied gas was recovered by dissolving it in 4 g of NMP, and the volume of alcohol was determined by using a Shimadzu Corporation GC-14A gas chromatograph.

[Evaluation of Film Production Performance]

The amount of gas generated and liquefied near the orifice during the film production, and the resulting film breakage was observed, and evaluation was conducted according to the following criteria.
- A: Gas generation and liquefaction is hardly seen near the orifice after 24 hours of film production, and film breakage is not found.
- B: Some degree of gas generation and liquefaction is seen near the orifice after 24 hours of film production, and but film breakage is not found.
- C: A considerable degree of gas generation and liquefaction is seen near the orifice after several hours of film production, and film breakage takes place frequently, requiring cleaning of the orifice to continue the film production.

Reference Example 1

Polymerization of PPS Resin (a) (PPS-1)

In a 70-liter autoclave equipped with a stirrer, 8,267.37 g (70.00 moles) of 47.5% sodium hydrosulfide, 2,957.21 g (70.97 moles) of 96% sodium hydroxide, 11,434.50 g (115.50 moles) of N-methyl-2-pyrolidone (NMP), 2,583.00 g (31.50 moles) of sodium acetate, and 10,500 g of ion-exchanged water were fed and gradually heated for about 3 hours up to 245° C. under atmospheric pressure while supplying nitrogen to evaporate 14,780.1 g of water and 280 g of NMP, followed by cooling the reaction container to 160° C. The residual water content per mole of the alkali metal sulfide fed was 1.06 moles including the water consumed to hydrolyze the NMP. The fly loss of the hydrogen sulfide was 0.02 mole per mole of the alkali metal sulfide fed.

Subsequently, 10,235.46 g (69.63 moles) of p-dichlorobenzene and 9,009.00 g (91.00 moles) of NMP were added, and the reaction container was sealed in a nitrogen atmosphere and heated at a rate of 0.6° C./min up to 23.8° C. while stirring at 240 rpm. After allowing the reaction to proceed at 238° C. for 95 minutes, the reaction container was heated at a rate of 0.8° C./min up to 270° C. After allowing the reaction to proceed at 270° C. for 100 minutes, the reaction container was cooled at a rate of 1.3° C./min down to 250° C. while injecting 1,260 g (70 moles) of water, this process being completed in 15 minutes. Then, it was cooled at rate of 1.0° C./min down to 200° C., followed by rapid cooling down to near room temperature.

The contents were taken out and diluted with 26,300 g of NMP, and the solvent and the solid material were passed through a filter (80 mesh) to obtain particles, which was washed in 31,900 g of NMP. The particles were washed several times in 56,000 g of ion-exchanged water and filtered, they were washed again in 70,000 g of 0.05 wt % acetic acid aqueous solution and filtered. They were washed in 70,000 g of ion-exchanged water and filtered, and the resulting water-containing PPS particles were dried in hot air at 80° C. and further dried under reduced pressure at 120° C. The resulting PPS had a melt viscosity of 200 Pa·s (at 310° C., shear velocity 1000/s).

Reference Example 2

Polymerization of PPS Resin (a) (PPS-2)

In a 70-liter autoclave equipped with a stirrer, 8,267.37 g (70.00 moles) of 47.5% sodium hydrosulfide, 2,957.21 g (70.97 moles) of 96% sodium hydroxide, 11,434.50 g (115.50 moles) of N-methyl-2-pyrolidone (NMP), 861.00 g (10.5 moles) of sodium acetate, and 10,500 g of ion-exchanged water were fed and gradually heated for about 3 hours up to 245° C. under atmospheric pressure while supplying nitrogen to evaporate 14,780.1 g of water and 280 g of NMP, followed by cooling the reaction container to 160° C. The residual water content per mole of the alkali metal sulfide fed was 1.06 moles including the water consumed to hydrolyze the NMP. The fly loss of the hydrogen sulfide was 0.02 mole per mole of the alkali metal sulfide fed.

Subsequently, 10,235.46 g (69.63 moles) of p-dichlorobenzene and 9,009.00 g (91.00 moles) of NMP were added, and the reaction container was sealed in a nitrogen atmosphere and heated at a rate of 0.6° C./min up to 238° C. while stirring at 240 rpm. After allowing the reaction to proceed at 238° C. for 95 minutes, the reaction container was heated at a rate of 0.8° C./min up to 270° C. After allowing the reaction to proceed at 270° C. for 100 minutes, the reaction container was cooled at a rate of 1.3° C./min down to 250° C. while injecting 1,260 g (70 moles) of water, this process being completed in 15 minutes. Then, it was cooled at rate of 1.0° C./min down to 200° C., followed by rapid cooling down to near room temperature.

The contents were taken out and diluted with 26,300 g of NMP, and the solvent and the solid material were passed through a filter (80 mesh) to obtain particles, which was washed in 31,900 g of NMP. The particles were washed several times in 56,000 g of ion-exchanged water and filtered, they were washed again in 70,000 g of 0.05 wt % acetic acid aqueous solution and filtered. They were washed in 70,000 g of ion-exchanged water and filtered, and the resulting water-containing PPS particles were dried in hot air at 80° C. and further dried under reduced pressure at 120° C. The resulting PPS resin (a) had a melt viscosity of 60 Pa·s (at 310° C., shear velocity 1000/s).

Reference Example 3

Polymerization of PPS Resin (a) (PPS-3)

In a 70-liter autoclave equipped with a stirrer, 8,267.37 g (70.00 moles) of 47.5% sodium hydrosulfide, 2,957.21 g (70.97 moles) of 96% sodium hydroxide, 11,434.50 g (115.50 moles) of N-methyl-2-pyrolidone (NMP), 1,639.99 g (20.0 moles) of sodium acetate, and 10,500 g of ion-exchanged water were fed and gradually heated for about 3 hours up to 245° C. under atmospheric pressure while supplying nitrogen to evaporate 14,780.1 g of water and 280 g of NMP, followed by cooling the reaction container to 160° C. The residual water content per mole of the alkali metal sulfide fed was 1.06 moles including the water consumed to hydrolyze the NMP. The fly loss of the hydrogen sulfide was 0.02 mole per mole of the alkali metal sulfide fed.

Subsequently, 10,235.46 g (69.63 moles) of p-dichlorobenzene and 9,009.00 g (91.00 moles) of NMP were added, and the reaction container was sealed in a nitrogen atmosphere and heated at a rate of 0.6° C./min up to 238° C. while stirring at 240 rpm. After allowing the reaction to proceed at 238° C. for 95 minutes, the reaction container was heated at a rate of 0.8° C./min up to 270° C. After allowing the reaction to proceed at 270° C. for 100 minutes, the reaction container was cooled at a rate of 1.3° C./min down to 0.250° C. while injecting 1,260 g (70 moles) of water, this process being completed in 15 minutes. Then, it was cooled at rate of 1.0° C./min down to 200° C., followed by rapid cooling down to near room temperature.

The contents were taken out and diluted with 26,300 g of NMP, and the solvent and the solid material were passed through a filter (80 mesh) to obtain particles, which was washed in 31,900 g of NMP. The particles were washed several times in 56,000 g of ion-exchanged water and filtered, they were washed again in 70,000 g of 0.05 wt % acetic acid aqueous solution and filtered. They were washed in 70,000 g of ion-exchanged water and filtered, and the resulting water-containing PPS particles were dried in hot air at 80° C. and further dried under reduced pressure at 120° C. The resulting PPS resin (a) had a melt viscosity of 130 Pa·s (at 310° C., shear velocity 1000/s).

Reference Example 4

Polyetherimide (PEI): Ultem 1010, manufactured by GE
Polyether sulfone (PES): Sumikaexcel 3600G, manufactured by Sumitomo Chemical Co., Ltd.

Examples 1 to 12

The components given in Tables 1 and 2 were dry-blended according to the proportions shown in Tables 1 and 2, and melt-kneaded in a Japan Steel Works TEX 30α biaxial extruder (L/D=45.5, kneading at 5 positions) with a vacuum bent under the conditions of a screw rotation rate of 300 rpm and a cylinder temperature adjusted so as to give resin of a temperature of 330° C. at the orifice of the die. The resin was pelletized with a strand cutter. After being dried overnight at 130° C., the pellets were injection-molded, and the tensile breaking elongation of each molded specimen and the diameter of the dispersed particles in the island phase were measured. Pellets dried overnight at 130° C. were also used for measuring the alcohol generation.

Furthermore, pellets dried at 180° C. for 3 hours under a reduced pressure of 1 mmHg were supplied to an extruder, melted at 310° C., passed through a metal-fiber filter with a 95% cut diameter of 10 μm, and discharged through the orifice of a T-die at a discharge rate of 50 kg/hr. The extruded molten sheet was cooled and solidified by allowing it to come in close contact with a metal drum with its surface maintained at 25° C. by applying positive electricity to produce a sheet of a non-oriented polyphenylene sulfide resin composition. Then, this unstretched sheet was subjected to a longitudinal drawing machine consisting of two or more heated rolls, in which the difference in their circumferential speed served to stretch the sheet 3.5 times in the longitudinal direction at a temperature of 103° C. Subsequently, both edges of the film sheet was held with clips, introduced into a tenter where the film was stretched 3.5 times in the width direction at a temperature of 105° C., followed by heat treatment at a temperature of 260° C. for 2 seconds to produce biaxially orientated polyphenylene sulfide resin composition film with a thickness of 25 μm. Results are shown in Tables 1 and 2.

Example 13

The components given in Column "example 13" in Table 2 were dry-blended according to the proportions shown in Column "example 13" in Table 2, and melt-kneaded in a Japan Steel Works TEX 30α biaxial extruder (L/D=45.5, kneading at 5 positions) with a vacuum bent under the conditions of a screw rotation rate of 300 rpm and a cylinder temperature adjusted so as to give resin of a temperature of 330° C. at the orifice of the die. The resin was pelletized with a strand cutter. Then, for molded specimens of these pellets, the tensile breaking elongation, the diameter of the dispersed particles in the island phase, and the alcohol generation were measured by the same procedure as in Example 2. Results are shown in Table 2.

Example 14

Melt-kneading was carried out by the same procedure as in Example 2 except that material was prepared by dry-blending the components given in Column "Example 14" in Table 2 according to the proportions shown in Column "Example 14" in Table 2, and that kneading was performed at 3 positions in the biaxial extruder. Then, the tensile breaking elongation, the diameter of the dispersed particles in the island phase, and the alcohol generation were measured, and the film production performance was evaluated. Results are shown in Table 2.

Example 15

The components given in Column "Example 15" in Table 2 were dry-blended according to the proportions shown in Column "Example 15" in Table 2, and melt-kneaded in a Japan Steel Works TEX 30α biaxial extruder (L/D=45.5, kneading at 3 positions) with a vacuum bent under the conditions of a screw rotation rate of 300 rpm and a cylinder temperature adjusted so as to give resin of a temperature of 330° C. at the orifice of the die. The resin was pelletized with a strand cutter. Then, these pellets were melt-kneaded again under the same conditions as described above, and pelletized with a strand cutter. By the same procedure as in Example 2 except for this, the tensile breaking elongation, the diameter of the dispersed particles in the island phase, and the alcohol generation were measured, and the film production performance was evaluated. Results are shown in Table 2.

Example 16

The components given in Column "Example 15" in Table 2 were dry-blended according to the proportions shown in Column "Example 15" in Table 2, and melt-kneaded in a Japan Steel Works TEX 30α biaxial extruder (L/D=45.5, kneading at 3 positions) with a vacuum bent under the conditions of a screw rotation rate of 300 rpm and a cylinder temperature adjusted so as to give resin of a temperature of 330° C. at the orifice of the die. The resin was pelletized with a strand cutter. Then, water was added to the pellets so that the components given in Column "Example 16" in Table 2 account for the same proportions as in Column "Example 16" in Table 2, and the pellets were melt-kneaded under the same conditions as described above, and pelletized with a strand cutter. By the same procedure as in Example 2 except for this, the tensile breaking elongation, the diameter of the dispersed particles in the island phase, and the alcohol generation were measured, and the film production performance was evaluated. Results are shown in Table 2.

Example 17

The components given in Column "Example 9" in Table 1 were dry-blended according to the proportions shown in Column "Example 9" in Table 1, and melt-kneaded in a Japan Steel Works TEX 30α biaxial extruder (L/D=45.5, kneading at 3 positions) with a vacuum bent under the conditions of a screw rotation rate of 300 rpm and a cylinder temperature adjusted so as to give resin of a temperature of 330° C. at the orifice of the die. The resin was pelletized with a strand cutter.

Then, PPS-1 and water were added to the pellets so that the components given in Column "Example 17" in Table 2 account for the same proportions as in Column "Example 17" in Table 2, and the pellets were melt-kneaded under the same conditions as described above, and pelletized with a strand cutter. By the same procedure as in Example 2 except for this, the tensile breaking elongation, the diameter of the dispersed particles in the island phase, and the alcohol generation were measured, and the film production performance was evaluated. Results are shown in Table 2.

Comparative Example 1

Melt kneading was carried out using a Japan Steel Works TEX 30α biaxial extruder (L/D=45.5, kneading at 5 positions) with a vacuum bent under the conditions of a screw rotation rate of 300 rpm and a cylinder temperature adjusted so as to give resin of a temperature of 330° C. at the orifice of the die as shown in Table 1 by the same procedure as in Example 1 except that the PEI and/or PES (b) and the compound comprising isocyanate group, epoxy group and/or amino group (c) were not used. The resin was pelletized with a strand cutter. After being dried overnight at 130° C., the pellets were injection-molded, the tensile breaking elongation of the molded specimens was measured, and the film production performance was evaluated. As seen from Table 1, results show that the tensile elongation was extremely lower than in Example 2.

Comparative Example 2

Melt kneading was carried out using a Japan Steel Works TEX 30α biaxial extruder (L/D=45.5, kneading at 5 positions) with a vacuum bent under the conditions of a screw rotation rate of 300 rpm and a cylinder temperature adjusted so as to give resin of a temperature of 330° C. at the orifice of the die as shown in Table 1 by the same procedure as in Example 1 except that the compound comprising isocyanate group, epoxy group and/or amino group (c) was not used. The resin was pelletized with a strand cutter. After being dried overnight at 130° C., the pellets were injection-molded, and the tensile breaking elongation of the molded specimens and the diameter of the dispersed particles in the island phase were measured. Then, the film production performance was evaluated. As seen from Table 1, results show that the tensile elongation is extremely lower than in Examples 1 through 2 and 5 through 7. It is also seen that the diameter of the dispersed particles in the island phase for the first mold injection is large, and that for the second mold injection is still larger.

Comparative Example 3

The same evaluation procedures as in Example 2 were carried out except that melt-kneading was carried out using a Tanabe Plastics Machinery 40 mm-diameter uniaxial extruder with a vacuum bent under the conditions of a preset temperature of 300° C. and a screw rotation rate of 80 rpm. Results are shown in Table 1. The tensile elongation is lower and the dispersed particle diameter in the island phase is larger than in Example 2. Furthermore, the alcohol generation is larger than in Example 2, and frequent film breakage is seen during film production.

Comparative Examples 4 and 5

Melt kneading was carried out using a Japan Steel Works TEX 30α biaxial extruder (L/D=45.5, kneading at 5 positions) with a vacuum bent under the conditions of a screw rotation rate of 300 rpm and a cylinder temperature adjusted so as to give resin of a temperature of 330° C. at the orifice of the die as shown in Table 1 by the same procedure as in Examples 10 and 11 except that the compatibilizer (c) was not used. The resin was pelletized with a strand cutter. After being dried overnight at 130° C., the pellets were injection-molded, and the tensile breaking elongation of the molded specimens and the diameter of the dispersed particles in the island phase were measured. Pellets dried overnight at 130° C. were also used for measuring the alcohol generation, and the film production performance was evaluated. As seen from Table 2, results show that the tensile elongation is extremely lower than in Examples 10 and 11. It is also seen that the diameter of the dispersed particles in the island phase for the first mold injection is large, and that for the second mold injection is still larger.

TABLE 1

|  |  | Comparative example 1 | Comparative example 2 | Comparative example 3 | Example 1 | Example 2 | Example 3 |
|---|---|---|---|---|---|---|---|
| Type of PPS |  | PPS-1 | PPS-1 | PPS-1 | PPS-1 | PPS-1 | PPS-2 |
| Amount of PPS | wt % | 100 | 95 | 95 | 95 | 95 | 95 |
| Type of PEI, PES |  | — | PEI | PEI | PEI | PEI | PEI |
| Amount of PEI, PES | wt % | — | 5 | 5 | 5 | 5 | 5 |
| Type of compatibilizer |  | — | — | C-2 | C-1 | C-2 | C-2 |
| Amount of compatibilizer | parts by weight*) | — | — | 0.5 | 0.5 | 0.5 | 0.5 |
| Type of inorganic filler |  | — | — | — | — | — | — |
| Amount of inorganic filler | parts by weight*) | — | — | — | — | — | — |
| Extruder |  | biaxial | biaxial | uniaxial | biaxial | biaxial | biaxial |
| L/D***) |  | 45.5 | 45.5 | 33 | 45.5 | 45.5 | 45.5 |
| Positions of kneading |  | 5 | 5 | 0 | 5 | 5 | 5 |
| Tesile breaking elongation | % | 30 | 25 | 60 | 140 | 150 | 120 |
| PEI, PES dispersed particle diameter (1st injection molding) | nm | — | 2500 | 1200 | 500 | 200 | 400 |
| PEI, PES dispersed particle diameter (2nd injection molding) | nm | — | 3400 | 1300 | 550 | 200 | 400 |
| Repetition of kneading | times | 1 | 1 | 1 | 1 | 1 | 1 |

TABLE 1-continued

|  |  |  |  |  |  |  |  |
|---|---|---|---|---|---|---|---|
| Water content | parts by weight*) | — | — | — | — | — | — |
| Alcohol generation | mmol %**) | — | — | 0.98 | — | 0.35 | 0.37 |
| Film production performance |  | B | B | C | B | B | B |

|  |  | Example 4 | Example 5 | Example 6 | Example 7 | Example 8 | Example 9 |
|---|---|---|---|---|---|---|---|
| Type of PPS |  | PPS-3 | PPS-1 | PPS-1 | PPS-1 | PPS-1 | PPS-1 |
| Amount of PPS | wt % | 95 | 95 | 95 | 95 | 95 | 70 |
| Type of PEI, PES |  | PEI | PEI | PEI | PEI | PES | PEI |
| Amount of PEI, PES | wt % | 5 | 5 | 5 | 5 | 5 | 30 |
| Type of compatibilizer |  | C-2 | C-3 | C-4 | C-5 | C-2 | C-2 |
| Amount of compatibilizer | parts by weight*) | 0.5 | 0.5 | 0.5 | 0.5 | 0.5 | 1.5 |
| Type of inorganic filler |  | — | — | — | — | — | — |
| Amount of inorganic filler | parts by weight*) | — | — | — | — | — | — |
| Extruder |  | biaxial | biaxial | biaxial | biaxial | biaxial | biaxial |
| L/D***) |  | 45.5 | 45.5 | 45.5 | 45.5 | 45.5 | 45.5 |
| Positions of kneading |  | 5 | 5 | 5 | 5 | 5 | 5 |
| Tesile breaking elongation | % | 130 | 125 | 120 | 80 | 160 | 110 |
| PEI, PES dispersed particle diameter (1st injection molding) | nm | 300 | 450 | 500 | 800 | 180 | 300 |
| PEI, PES dispersed particle diameter (2nd injection molding) | nm | 300 | 450 | 500 | 900 | 180 | 300 |
| Repetition of kneading | times | 1 | 1 | 1 | 1 | 1 | 1 |
| Water content | parts by weight*) | — | — | — | — | — | — |
| Alcohol generation | mmol %**) | 0.35 | — | 0.41 | 0.43 | 0.36 | 0.55 |
| Film production performance |  | B | B | B | B | B | B |

*)Sum of PPS and (PEI, PES) accounts for 100 parts by weight.
**)Alcohol generation in mmol % per gram of PPS resin composition.
***)Ratio of extruder's screw length (L) to screw diameter (D)
C-1: 2,6-tolylene diisocyanate (Nippon Polyurethane Industry Co., Ltd.; Coronate T-65)
C-2: 3-isocyanatepropyltriethoxysilane (Shin-Etsu Chemical Co., Ltd.; KBE9007)
C-3: novolak phenol epoxy (Sumitomo Chemical Co., Ltd.; ESCN-220HH)
C-4: 2-(3,4-epoxy cyclohexyl)ethyl trimethoxysilane(Shin-Etsu Chemical Co., Ltd.; KBM303)
C-5: gamma-aminopropyl triethoxysilane (Shin-Etsu Chemical Co., Ltd.; KBE903)
D-1: calcium carbonate (Calfine Co., Ltd.; KSS-1000)

TABLE 2

|  |  | Example 10 | Example 11 | Example 12 | Example 13 | Comparative example 4 |
|---|---|---|---|---|---|---|
| Type of PPS |  | PPS-1 | PPS-1 | PPS-1 | PPS-1 | PPS-1 |
| Amount of PPS | wt % | 90 | 95 | 95 | 95 | 95 |
| Type of PEI, PES |  | PEI | PEI | PEI | PEI | PEI |
| Amount of PEI, PES | wt % | 10 | 5 | 5 | 5 | 5 |
| Type of compatibilizer |  | C-2 | C-2 | C-2 | C-2 | — |
| Amount of compatibilizer | parts by weight*) | 1 | 0.5 | 0.5 | 0.5 | — |
| Type of inorganic filler |  | — | D-1 | D-1 | D-1 | D-1 |
| Amount of inorganic filler | parts by weight*) | — | 0.5 | 8 | 40 | 0.5 |
| Extruder |  | biaxial | biaxial | biaxial | biaxial | biaxial |
| L/D***) |  | 45.5 | 45.5 | 45.5 | 45.5 | 45.5 |
| Positions of kneading |  | 5 | 5 | 5 | 5 | 5 |
| Tesile breaking elongation | % | 165 | 145 | 100 | 15 | 75 |
| PEI, PES dispersed particle diameter (1st injection molding) | nm | 150 | 210 | 195 | 195 | 1100 |
| PEI, PES dispersed particle diameter (2nd injection molding) | nm | 150 | 210 | 195 | 195 | 2200 |
| Repetition of kneading | times | 1 | 1 | 1 | 1 | 1 |
| Water content | parts by weight*) | — | — | — | — | — |
| Alcohol generation | mmol %**) | 0.44 | 0.38 | 0.35 | 0.29 | — |
| Film production performance |  | B | B | B | — | B |

|  |  | Comparative example 5 | Example 14 | Example 15 | Example 16 | Example 17 |
|---|---|---|---|---|---|---|
| Type of PPS |  | PPS-1 | PPS-1 | PPS-1 | PPS-1 | PPS-1 |
| Amount of PPS | wt % | 95 | 90 | 90 | 90 | 90 |
| Type of PEI, PES |  | PEI | PEI | PEI | PEI | PEI |
| Amount of PEI, PES | wt % | 5 | 10 | 10 | 10 | 10 |
| Type of compatibilizer |  | — | C-2 | C-2 | C-2 | C-2 |

TABLE 2-continued

| | | | | | | |
|---|---|---|---|---|---|---|
| Amount of compatibilizer | parts by weight*) | — | 0.5 | 0.5 | 0.5 | 0.5 |
| Type of inorganic filler | | D-1 | — | — | — | — |
| Amount of inorganic filler | parts by weight*) | 8 | — | — | — | — |
| Extruder | | biaxial | biaxial | biaxial | biaxial | biaxial |
| L/D***) | | 45.5 | 45.5 | 45.5 | 45.5 | 45.5 |
| Positions of kneading | | 5 | 3 | 3 | 3 | 3 |
| Tesile breaking elongation | % | 35 | 135 | 160 | 170 | 165 |
| PEI, PES dispersed particle diameter (1st injection molding) | nm | 1300 | 250 | 135 | 120 | 125 |
| PEI, PES dispersed particle diameter (2nd injection molding) | nm | 2300 | 250 | 135 | 120 | 125 |
| Repetition of kneading | times | 1 | 1 | 2 | 2 | 2 |
| Water content | parts by weight*) | — | — | — | 1 | 1 |
| Alcohol generation | mmol %**) | — | 0.65 | 0.26 | 0.15 | 0.16 |
| Film production performance | | B | C | A | A | A |

*)Sum of PPS and (PEI, PES) accounts for 100 parts by weight.
**)Alcohol generation in mmol % per gram of PPS resin composition.
***)Ratio of extruder's screw length (L) to screw diameter (D)
C-1: 2,6-tolylene diisocyanate (Nippon Polyurethane Industry Co., Ltd.; Coronate T-65)
C-2: 3-isocyanatepropyltriethoxysilane (Shin-Etsu Chemical Co., Ltd.; KBE9007)
C-3: novolak phenol epoxy (Sumitomo Chemical Co., Ltd.; ESCN-220HH)
C-4: 2-(3,4-epoxy cyclohexyl)ethyl trimethoxysilane(Shin-Etsu Chemical Co., Ltd.; KBM303)
C-5: gamma-aminopropyl triethoxysilane (Shin-Etsu Chemical Co., Ltd.; KBE903)
D-1: calcium carbonate (Calfine Co., Ltd.; KSS-1000)

Example 18

The composition used in Example 10 was supplied to a 65 mm uniaxial extruder, and the discharged resin was collected through an adapter and extruded from a die to produce a tube. Then, the tube was cooled and passed through a sizing die, which serves for size control, followed by taking up the material from a take-up apparatus at a rate of 50 cm/min to provide a high-toughness tube with an outside diameter of 8 mm and an inside diameter of 6 mm.

INDUSTRIAL APPLICABILITY

The PPS resin composition has a very high toughness and has a high processability because of smaller gas emission during thermal melting, and therefore, it is particularly useful for extrusion molding to produce film, sheets, and fiber as well as for injection molding.

The invention claimed is:

1. A polyphenylene sulfide resin composition comprising 100 parts by weight of a resin composition that consists of 99 to 60 wt % of a polyphenylene sulfide resin (a), and 1 to 40 wt % of at least one type of noncrystalline resin (b) selected from the group consisting of polyetherimide resin and polyether sulfone resin and 0.1 to 10 parts by weight of a compound (c) containing at least one group selected from epoxy group, amino group and isocyanate group, wherein the noncrystalline resin (b) forms an island phase and the number-average dispersed particle size of the noncrystalline resin (b) is 1,000 nm or less.

2. The polyphenylene sulfide resin composition of claim 1, wherein compound (c) contains either one or more isocyanate groups or two or more epoxy groups.

3. The polyphenylene sulfide resin composition of claim 1, wherein compound (c) is alkoxysilane that contains an isocyanate group.

4. The polyphenylene sulfide resin composition of claim 1, wherein noncrystalline resin (b) has a number-average dispersed particle size of 500 nm or less.

5. The polyphenylene sulfide resin composition of claim 1, further comprising 0.0001 to 30 parts by weight, relative to the sum of polyphenylene sulfide resin (a) and noncrystalline resin (b), of an inorganic filler (d).

6. The polyphenylene sulfide resin composition of claim 1, wherein noncrystalline resin (b) is polyetherimide resin.

7. The polyphenylene sulfide resin composition of claim 1, wherein an amount of lower alcohols with 1 to 4 carbon atoms generated when pellets of the polyphenylene sulfide resin composition are thermally melted in a vacuum by heating at 350° C. for 30 minutes is 0.6 mmol % or less relative to the weight of the polyphenylene sulfide resin composition.

8. The polyphenylene sulfide resin composition of claim 1, having a tensile elongation (measured by Tensilon UTA2.5T tensile tester with a chuck distance 64 mm and a tension speed of 10 mm/min) of a ASTM No. 4 dumbbell-type molded specimen of 80% or more.

9. The polyphenylene sulfide resin composition of claim 1, wherein the number-average dispersed particle size of noncrystalline resin (b) in a molded specimen that is prepared by injection-molding the composition, crushing it and injection-molding it again is 1,000 nm or less.

10. The polyphenylene sulfide resin composition of claim 1, wherein polyphenylene sulfide resin (a) has a melt viscosity that is higher than 80 Pa·s under conditions of a temperature of 310° C. and a shear velocity of 1000/s.

11. The polyphenylene sulfide resin composition of claim 10, wherein polyphenylene sulfide resin (a) has a melt viscosity that is higher than 150 Pa·s under conditions of a temperature of 310° C. and a shear velocity of 1000/s.

12. A molded product produced from a polyphenylene sulfide resin composition as claimed in claim 1.

13. The molded product as claimed in claim 12, wherein the molded product is a film, sheet or tube.

* * * * *

UNITED STATES PATENT AND TRADEMARK OFFICE
CERTIFICATE OF CORRECTION

PATENT NO. : 8,221,862 B2
APPLICATION NO. : 12/293199
DATED : July 17, 2012
INVENTOR(S) : Saitoh et al.

It is certified that error appears in the above-identified patent and that said Letters Patent is hereby corrected as shown below:

In Column 21

At line 39, please change "23.8°C" to -- 238°C --.

Signed and Sealed this
Fifth Day of February, 2013

Teresa Stanek Rea
*Acting Director of the United States Patent and Trademark Office*